US008020274B2

(12) United States Patent
Lin

(10) Patent No.: US 8,020,274 B2
(45) Date of Patent: Sep. 20, 2011

(54) METHOD FOR MARKING A SOCKET

(75) Inventor: Da-Sen Lin, Taichung (TW)

(73) Assignee: Jing Xiang Kai Industry Co., Ltd., Taichung (TW)

( * ) Notice: Subject to any disclaimer, the term of this patent is extended or adjusted under 35 U.S.C. 154(b) by 396 days.

(21) Appl. No.: 12/356,512

(22) Filed: Jan. 20, 2009

(65) Prior Publication Data

US 2010/0180659 A1 Jul. 22, 2010

(51) Int. Cl.
*B23P 25/00* (2006.01)
*B25B 13/06* (2006.01)

(52) U.S. Cl. ............. 29/458; 29/557; 72/414; 81/121.1; 81/119; 81/DIG. 5

(58) Field of Classification Search .................... 81/119, 81/121.1, 124.2, 124.4, DIG. 5, DIG. 29; 72/370.4, 414, 416; 29/458, 557, 592
See application file for complete search history.

(56) References Cited

U.S. PATENT DOCUMENTS

| | | | | |
|---|---|---|---|---|
| 3,600,918 | A * | 8/1971 | Lemelson | 72/7.4 |
| 6,761,093 | B2 * | 7/2004 | Chang | 81/121.1 |
| 7,010,998 | B2 * | 3/2006 | Ying-Hao | 81/121.1 |
| 7,028,588 | B2 * | 4/2006 | Shih | 81/121.1 |
| 7,461,593 | B2 * | 12/2008 | Hu | 101/4 |
| 7,543,366 | B2 * | 6/2009 | Hu | 29/458 |
| 2004/0003638 | A1 * | 1/2004 | Schaefer et al. | 72/41 |
| 2006/0090612 | A1 * | 5/2006 | Peng | 81/121.1 |
| 2008/0301928 | A1 * | 12/2008 | Hu | 29/592 |

* cited by examiner

*Primary Examiner* — David Jones

(57) ABSTRACT

A method is disclosed for marking a socket. The method includes the steps of providing a socket, pressing the socket to make an indented mark, executing thermal treatment on the socket, coloring a portion of the socket near the indented mark to form a printed layer, vibrating and grinding the socket to remove the printed layer from the socket except the indented mark, and electroplating the socket to form a coating on an external side and an internal side of the socket.

6 Claims, 9 Drawing Sheets

METHOD FOR MARKING A SOCKET

FIELD OF INVENTION

The present invention relates to a socket wrench and, more particularly, to a method for marking a socket of a socket wrench so that the socket bears a clear, durable and aesthetic mark.

BACKGROUND OF INVENTION

To drive a fastener such as a threaded bolt and a nut, an open-ended wrench, a box-ended wrench, a monkey wrench or a socket wrench may be used. A socket wrench kit includes a handle and a set of sockets of various sizes. In operation, the handle is connected to a selected one of the sockets for driving a fastener of a certain size. Thus, a socket wrench kit can be used to drive fasteners of various sizes. A socket wrench kit is lighter and less expensive than a set of open-ended wrenches or box-ended wrenches. The handle of a socket wrench kit often includes a selective one-way driving mechanism. Therefore, a socket wrench kit is more convenient than a monkey wrench.

It is important to mark the sockets of a socket wrench kit to indicate the sizes of the sockets. There has been an attempt to provide plastic collars of different colors on sockets of different sizes. The plastic collars could easily be blurred, damaged or detached from the sockets so that the sockets would be poorly marked or not marked at all.

Alternatively, indented marks may be made in the sockets by pressing. It however requires an expensive machine to execute the pressing. Moreover, the indented marks are unclear on the sockets. This problem will be even worse when the indented marks are filled with dirt and grease after some time of use.

A socket is generally coated after the pressing. The coating is useful in protecting the socket from rust. The coating is provided on the socket within and outside the indented mark. That is, the color of the socket within the indented mark is identical to the color of the socket outside the indented mark. The coating makes the indented marks more unclear.

There has been another attempt to provide manganese phosphate on a socket after the pressing. The manganese phosphate is useful in protecting the socket from rust. The manganese phosphate however makes the socket look black and blur the indented mark.

Referring to FIGS. 1 and 2, a conventional method for marking a socket 10 is shown. At first, the socket 10 is formed. Secondly, an indented mark 11 is made in the socket 10 by pressing. Thirdly, a coating 16 is provided the socket 10 by electroplating. Fourthly, the socket 10 is ground near the indented mark 11. Fifthly, black dye is provided on the socket 10 near the indented mark 11 so that the indented mark 11 is filled with the black dye. Thus, a black mark 15 is formed in the indented mark 11. Finally, electroplating is done on the socket 10 near the indented mark 11. However, the contrast of the black mark 15 against the socket 10 is not sharp. Therefore, the black mark 15 is not clear. Moreover, black is sometimes undesired for a trademark.

Therefore, the present invention is intended to obviate or at least alleviate the problems encountered in prior art.

SUMMARY OF INVENTION

It is the primary objective of the present invention to provide a method for marking a socket.

To achieve the foregoing objective, the method includes the steps of providing a socket, pressing the socket to make an indented mark, executing thermal treatment on the socket, coloring a portion of the socket near the indented mark to form a printed layer, vibrating and grinding the socket to remove the printed layer from the socket except the indented mark, and electroplating the socket to form a coating on an external side and an internal side of the socket.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
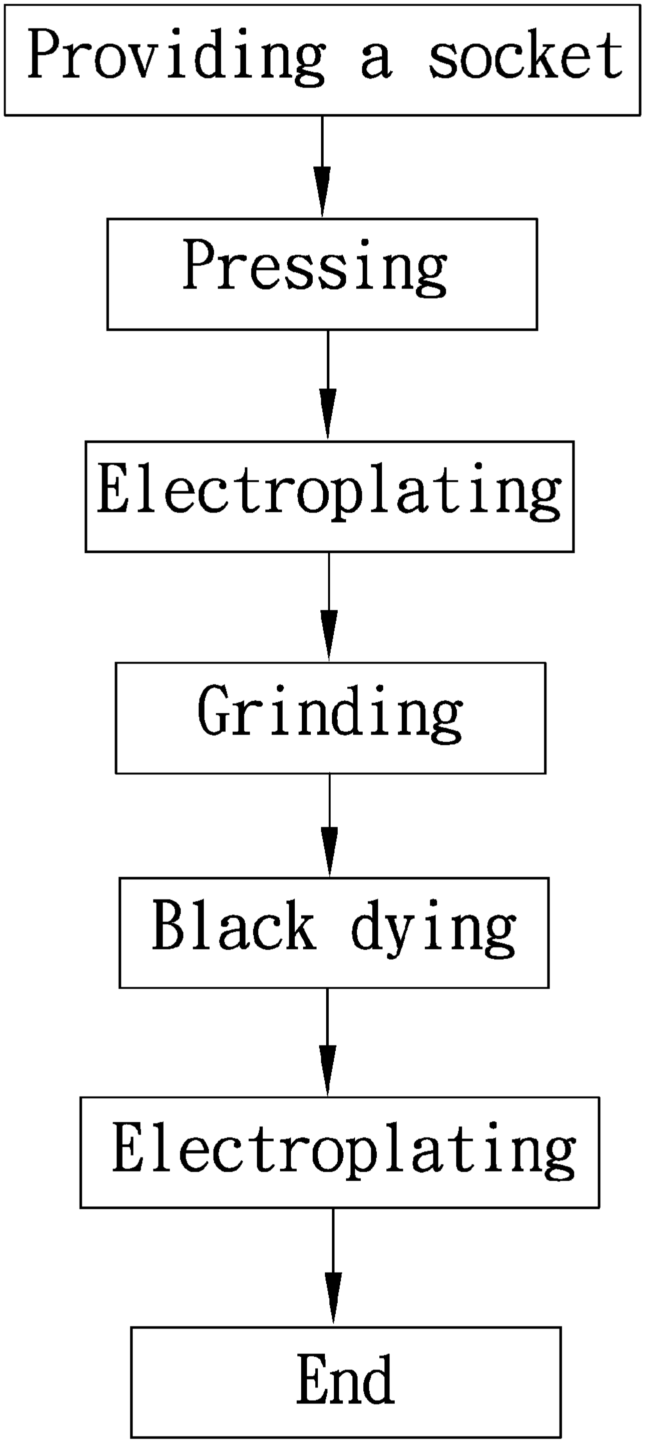
FIG. 1 Prior Art
FIG. 1 is a flow chart of a conventional method for marking a socket.
Figure 2:
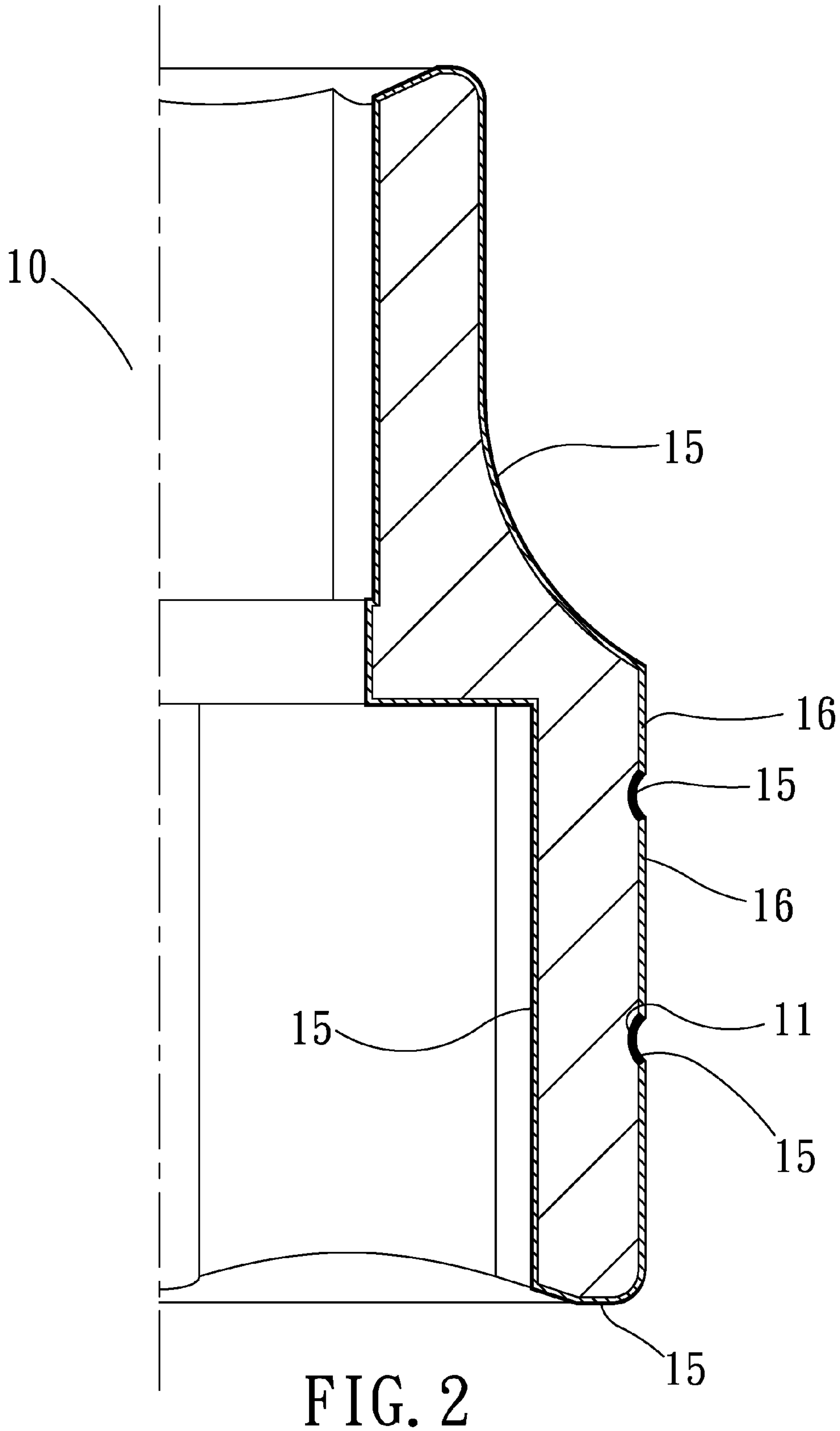
FIG. 2 Prior Art
FIG. 2 is a partial, cross-sectional view of the socket marked in the method shown in FIG. 1.
Figure 3:
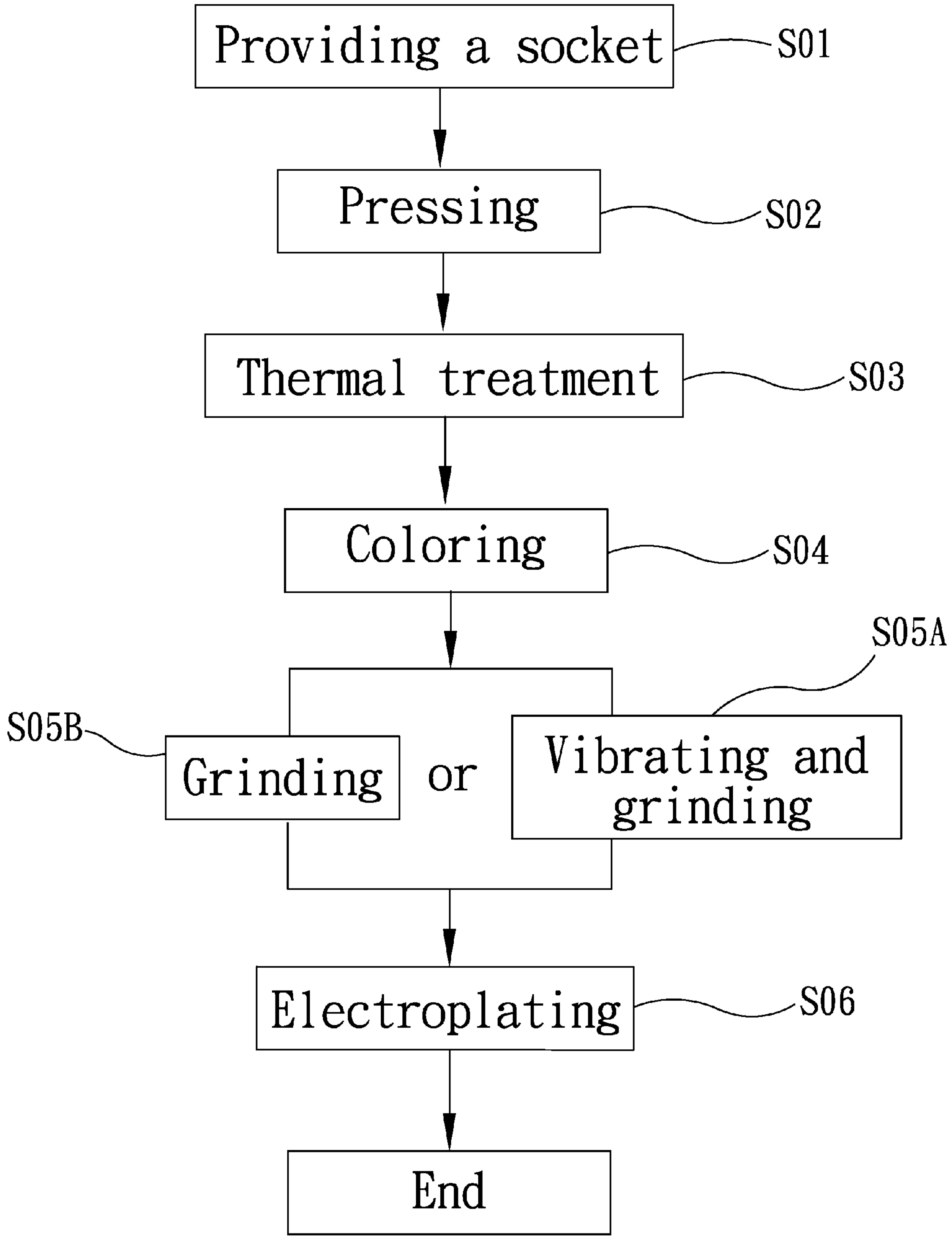
FIG. 3 is a flow chart of a method for making a socket according to the preferred embodiment of the present invention.

Referring to FIG. 3, there is shown a method for marking a socket according to the preferred embodiment of the present invention.

Figure 4:
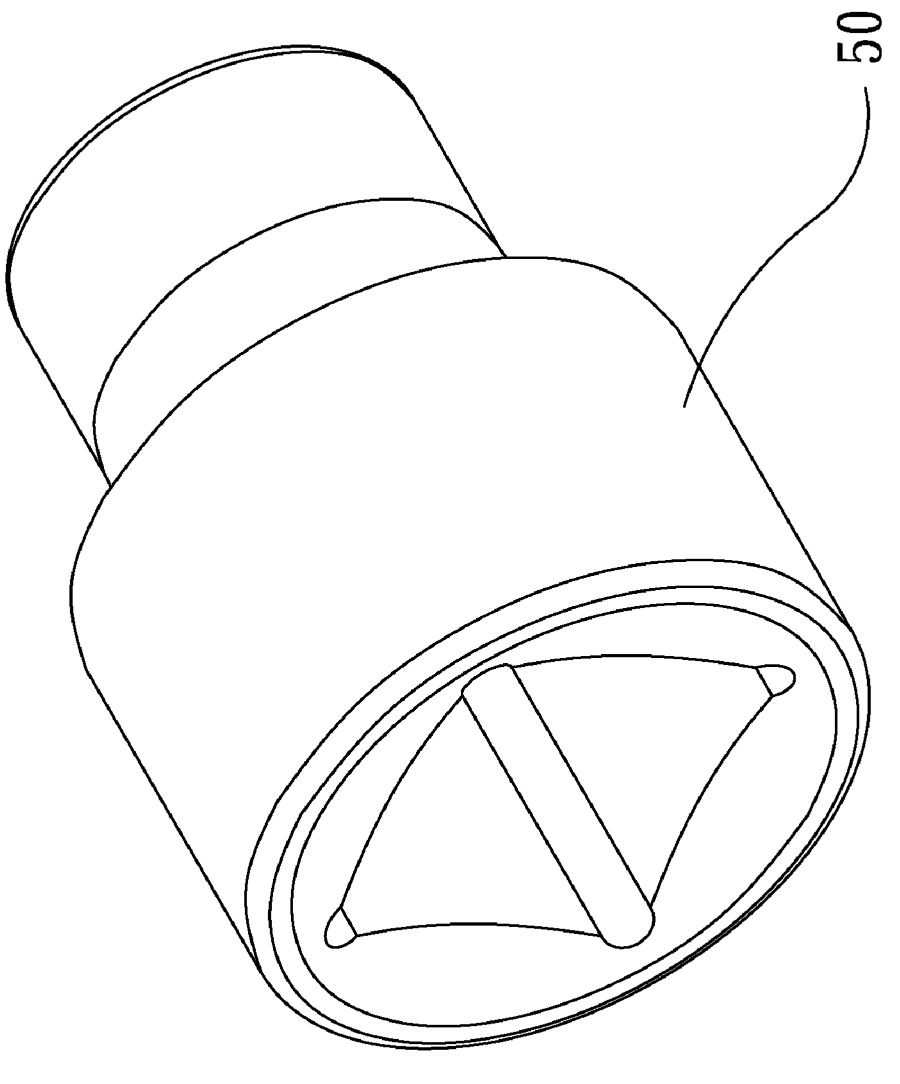
FIG. 4 is a perspective view of a socket before executing the method shown in FIG. 3.

Referring to FIGS. 3 and 4, at S01, a socket 50 is made of metal by casting and/or lathing for example. The socket generally includes a square recess in an end for receiving a portion of a handle of a socket wrench and a hexagonal recess in an opposite end for receiving a portion of a fastener.

Figure 5:
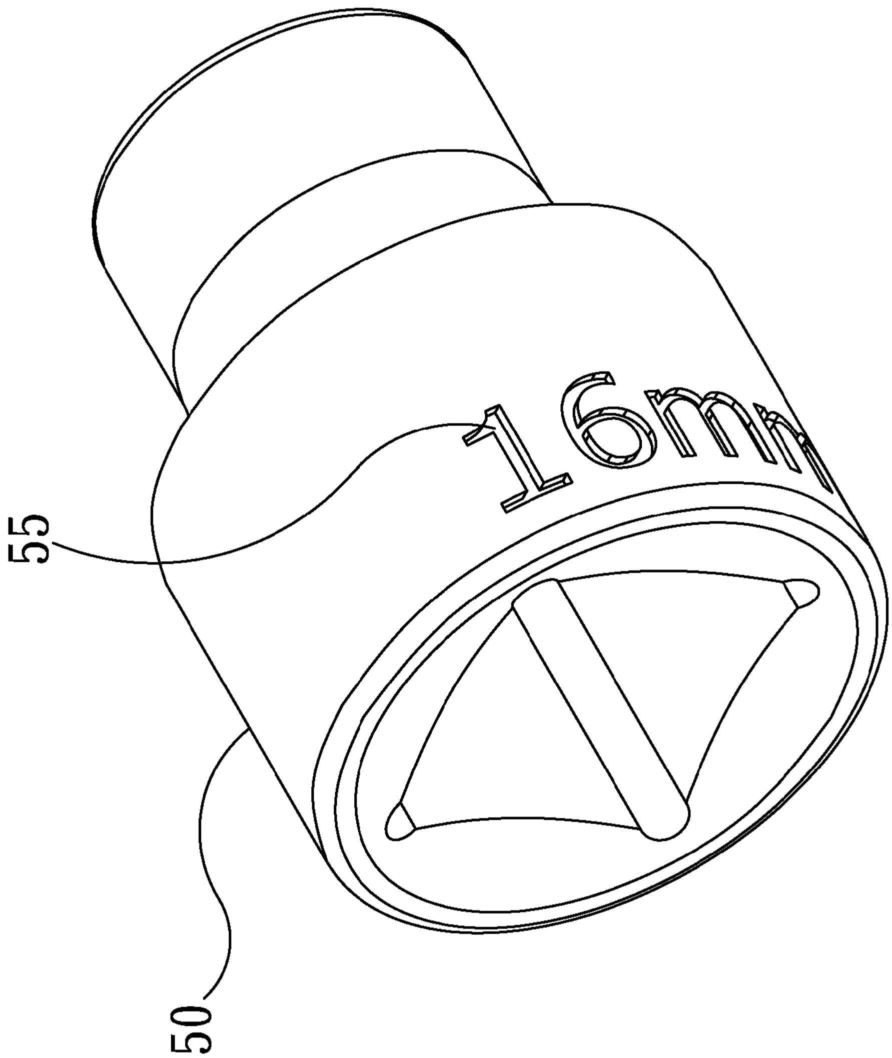
FIG. 5 is a partial, cross-sectional view of the socket after a pressing step of the method shown in FIG. 3.

Referring to FIGS. 3 and 5, at S02, pressing is conducted on the socket 50 to make an indented mark 55 corresponding to the size, a trademark or the name of the manufacturer of the socket 50.

Figure 6:
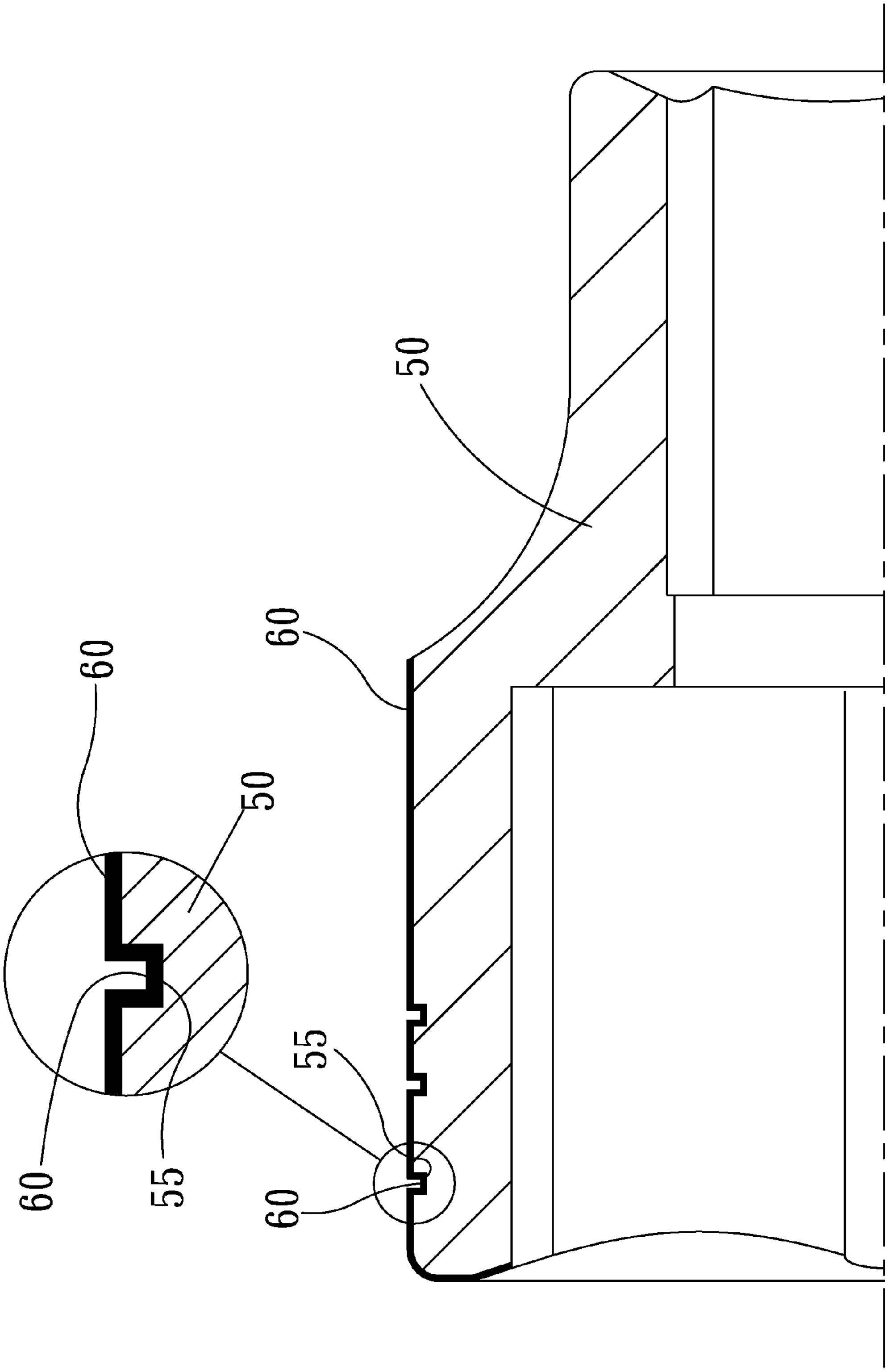
FIG. 6 is a partial, cross-sectional view of the socket after a coloring step of the method shown in FIG. 3.

Referring to FIGS. 3 and 6, at S03, thermal treatment is conducted on the socket 50 to increase the hardness of the socket 50. Thus, a portion of the socket 50 near the indented mark 55, in particular, is not vulnerable to wearing. Therefore, the depth of the indented mark 55 is retained.

Referring to FIGS. 3 and 6, at S04, coloring is conducted on the socket 50 to form a printed layer 60 on the socket 50 near the indented mark 55. The printed layer 60 can be made in various colors. Colorant is filled in the indented mark 55.

Figure 7:
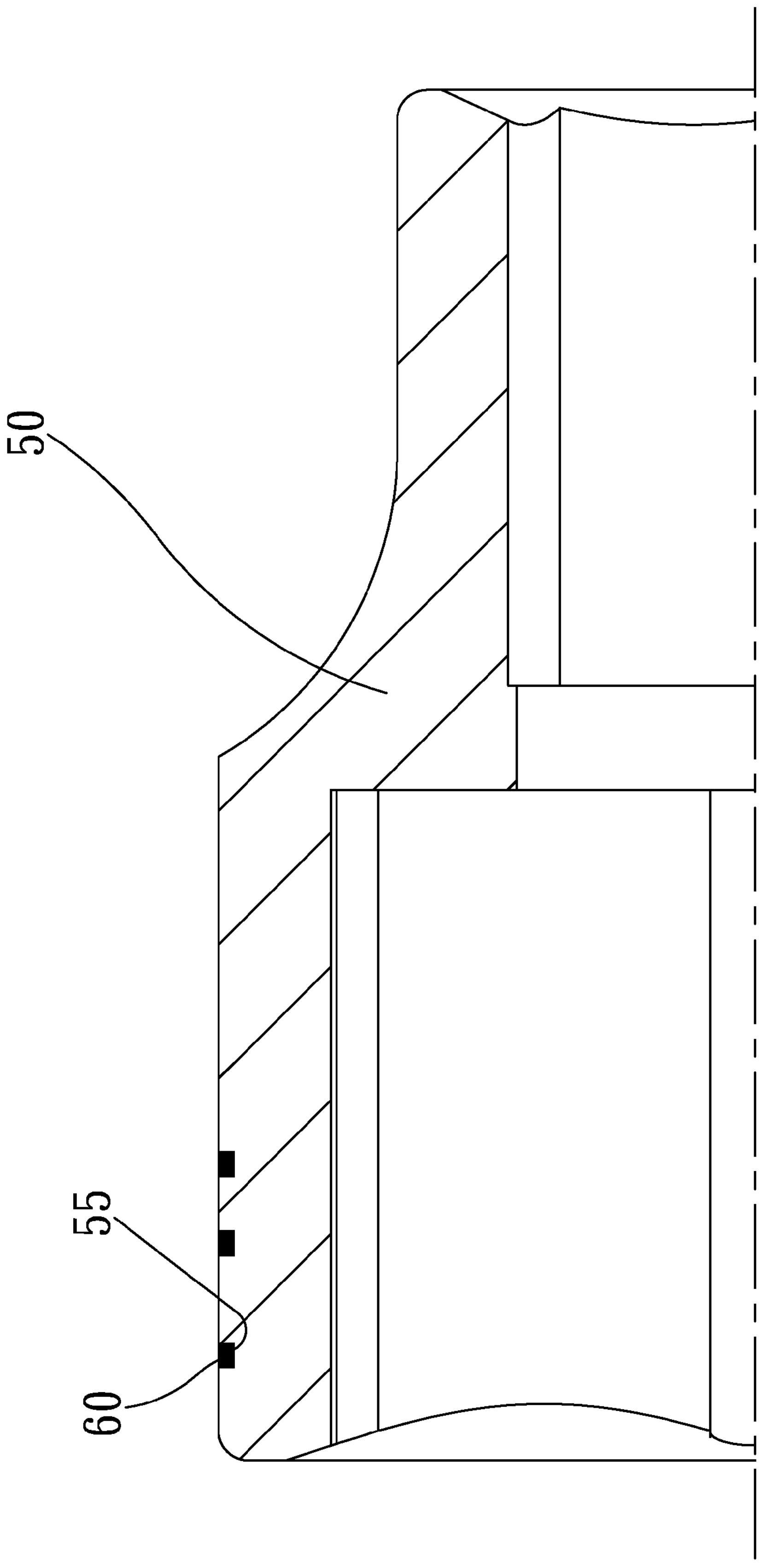
FIG. 7 is a partial, cross-sectional view of the socket after a grinding step of the method shown in FIG. 3.

Referring to FIGS. 3 and 7, at S05A, vibrating and grinding are conducted on the socket 50 to remove most of the printed layer 60 from the socket, leaving only the coolant in the indented mark 55. That is, a colored mark is left in the indented mark 50. Simultaneously, dirt and grease are removed from the coolant in the indented mark 55.

Figure 8:
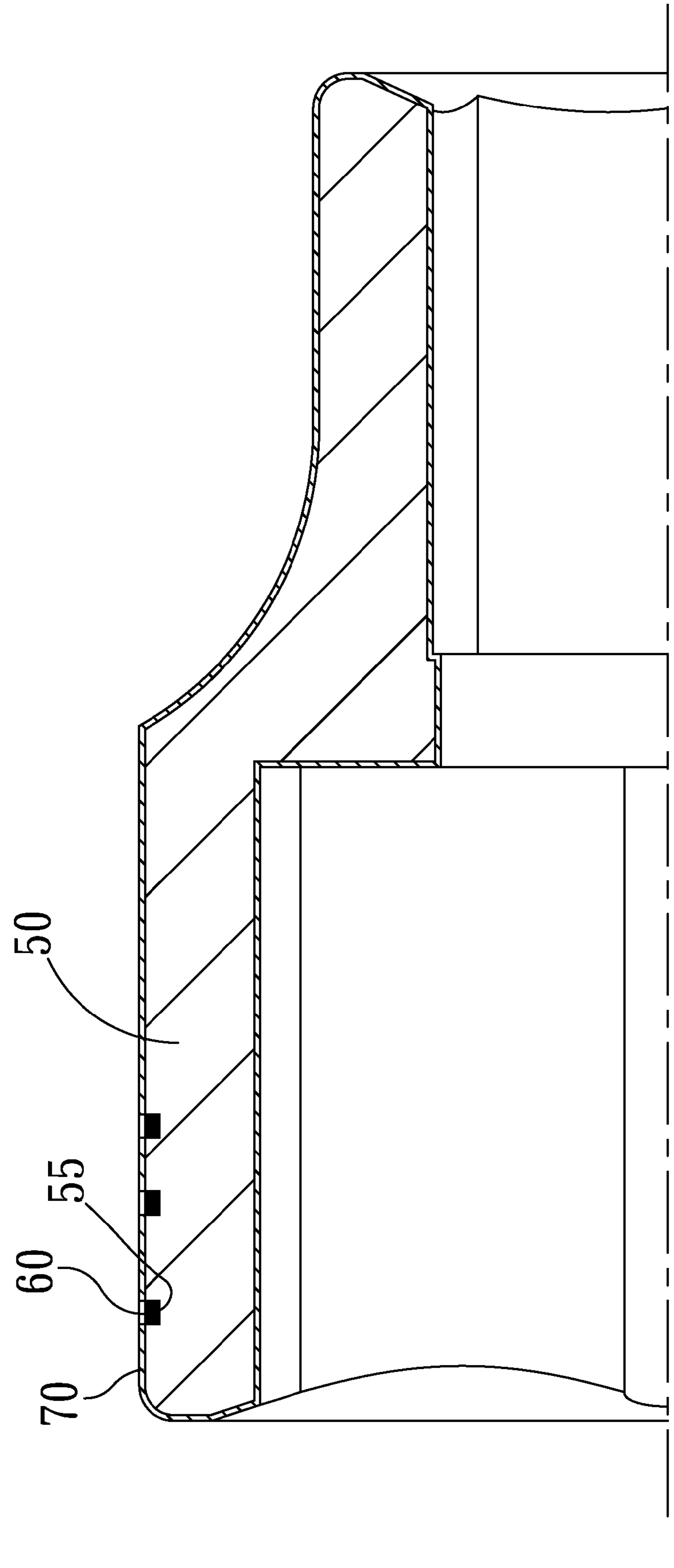
FIG. 8 is a partial, cross-sectional view of the socket after an electroplating step of the method shown in FIG. 3.

The vibrating and grinding indicated with xS05Ax may be replaced with conventional grinding indicated with xS05B.x Referring to FIGS. 3 and 8, at S06, electroplating is conducted on the socket 50 to form a coating 70 on an internal side and an external side of the socket 50 except the printed layer 60 (or xcolored markx). The coating 70 cannot be provided on the printed layer 60 because the printed layer 60 is made of an isolating material.

Figure 9:
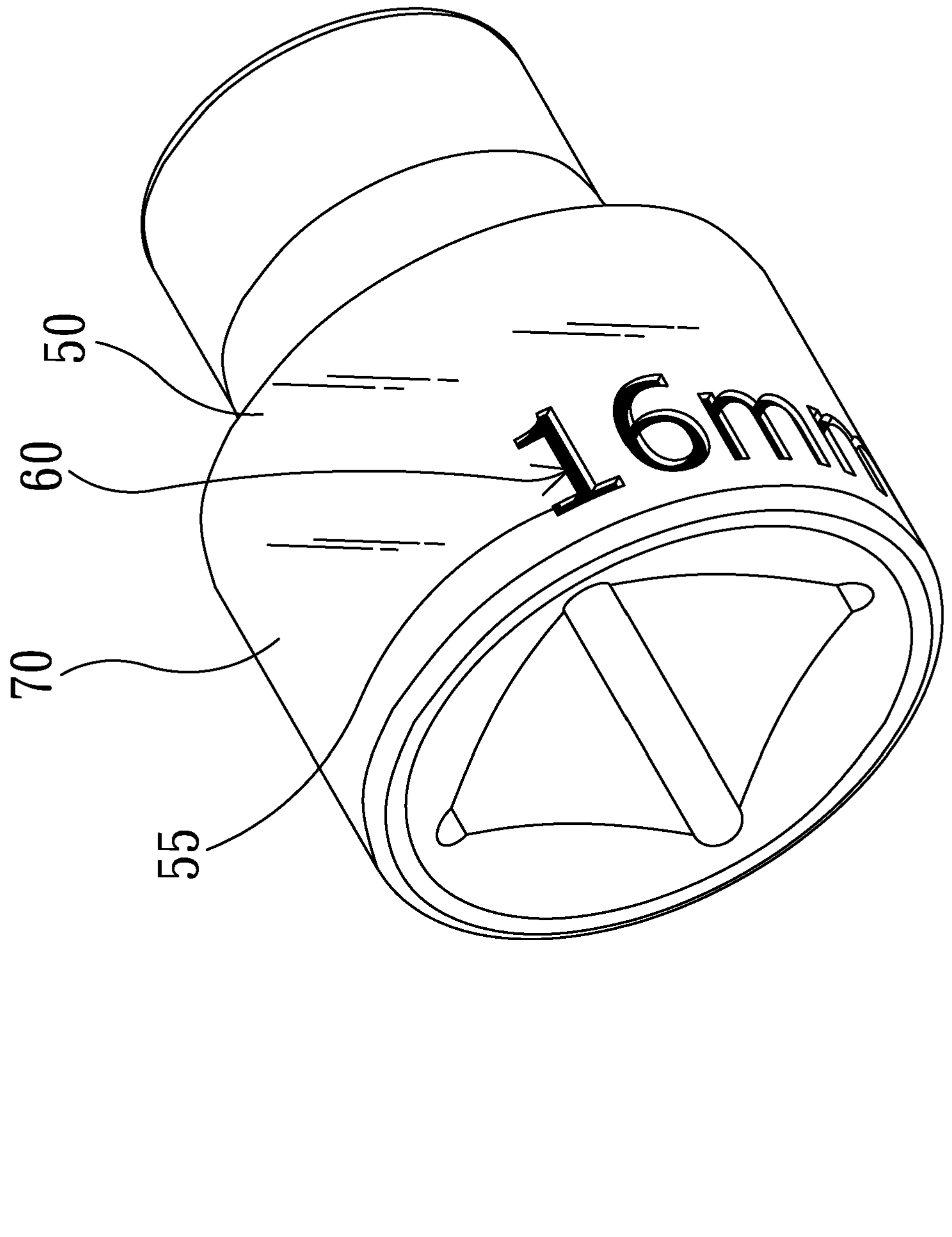
FIG. 9 is a perspective view of the socket shown in FIG. 8.

Referring to FIG. 9, the printed layer 60 is in strong contrast with the coating 70 so that the printed layer 60 looks clear amid the coating 70.

The socket 50 exhibits at least four advantages. Firstly, the printed layer 60 is colorful. Secondly, the attachment of the printed layer 60 to the socket 50 is firm because it is done when the surface of the socket 50 within the indented mark 55 without the coating 70. Thirdly, the printed layer 60 looks clear amid the coating 70 because the former is in strong contrast with the latter. Fourthly, the indented mark 55 is always obvious, i.e., the depth thereof is retained because the thermal treatment makes the socket 50 hard so that is not vulnerable to wearing.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for marking a socket comprising the steps of:

providing a socket;

pressing the socket to make an indented mark;

executing thermal treatment on the socket;

coloring a portion of the socket near the indented mark to form a printed layer;

vibrating and grinding the socket to remove the printed layer from the socket except the indented mark; and electroplating the socket to form a coating on an external side and an internal side of the socket.

2. The method according to claim 1, wherein the indented mark is made corresponding to a mark selected from a group consisting of a size and a trademark.

3. The method according to claim 1, wherein the printed layer can be provided in various colors.

4. A method for marking a socket comprising the steps of:

providing a socket;

pressing the socket to make an indented mark;

executing thermal treatment on the socket;

coloring a portion of the socket near the indented mark to form a printed layer that is isolating;

grinding the socket to remove the printed layer from the socket except the indented mark; and electroplating the socket to form a coating on an external side and an internal side of the socket.

5. The method according to claim 4, wherein the indented mark is made corresponding to a mark selected from a group consisting of a size and a trademark.

6. The method according to claim 4, wherein the printed layer can be provided in various colors.

* * * * *